United States Patent
Li

(10) Patent No.: US 8,462,427 B2
(45) Date of Patent: Jun. 11, 2013

(54) CARRIER ENVELOPE PHASE STABILIZATION OF AN OPTICAL AMPLIFIER

(75) Inventor: Chengquan Li, Sunnyvale, CA (US)

(73) Assignee: Coherent, Inc., Santa Clara, CA (US)

( * ) Notice: Subject to any disclaimer, the term of this patent is extended or adjusted under 35 U.S.C. 154(b) by 657 days.

(21) Appl. No.: 12/689,845

(22) Filed: Jan. 19, 2010

(65) Prior Publication Data

US 2011/0019267 A1    Jan. 27, 2011

Related U.S. Application Data

(60) Provisional application No. 61/228,461, filed on Jul. 24, 2009.

(51) Int. Cl.
*H01S 3/10* (2006.01)
*H01S 3/13* (2006.01)

(52) U.S. Cl.
USPC ............................................. 359/337; 372/25

(58) Field of Classification Search
USPC ..................... 359/333, 337, 337.5; 372/25
See application file for complete search history.

(56) References Cited

U.S. PATENT DOCUMENTS

| 6,850,543 | B2 | 2/2005 | Cundiff et al. |
| 7,418,017 | B2 | 8/2008 | Holzwarth et al. |
| 7,474,457 | B2 | 1/2009 | Krausz et al. |
| 7,567,596 | B2 * | 7/2009 | Dantus et al. .................. 372/30 |
| 2009/0092167 | A1 | 4/2009 | Stingl et al. |
| 2009/0135059 | A1 | 5/2009 | Chun |
| 2010/0040097 | A1 | 2/2010 | Verhoef |

FOREIGN PATENT DOCUMENTS

| WO |  03/055015 A1 | 7/2003 |
| WO | WO 2007/149956 A2 | 12/2007 |
| WO | WO 2009126810 A2 * | 10/2009 |

OTHER PUBLICATIONS

International Search Report and Written Opinion received for PCT Patent Application No. PCT/US2010/042244, mailed on Mar. 29, 2012, 10 pages.
Chang, Zenghu., "Carrier-Envelope Phase Shift Caused by Grating-Based Stretchers and Compressors", Applied Optics, vol. 45, No. 32, Nov. 10, 2006, pp. 8350-8353.
Ohmae et al., "Spatial Spectrum Chirp Characteristic of a Martinez-Type Multipass Pulse Stretcher", Japanese Journal of Applied Physics, vol. 39, Part 1, No. 10, Oct. 2000, pp. 5864-5869.
Yamakawa et al., "Tunable Ti: Sapphire Regenerative Amplifier for Femtosecond Chirped-Pulse Amplification", Applied Physics B Laser and Optics, vol. 58, No. 4, 1994, pp. 326-326.
International Preliminary Report on Patentability received for PCT Patent Application No. PCT/US2010/042244, mailed on Apr. 12, 2012, 7 pages.

(Continued)

*Primary Examiner* — Eric Bolda
(74) *Attorney, Agent, or Firm* — Morrison & Foerster LLP

(57) ABSTRACT

A laser and amplifier combination delivers a sequence of optical pulses. Pulses from the laser are temporally stretched by a pulse stretcher before amplification and temporally compressed by a pulse compressed after amplification. The pulse stretcher includes a diffraction grating on which pulses being compressed are incident. An arrangement is provided for measuring the carrier-envelope phase of the pulses and adjusting the incidence angle of pulses on the grating cooperative with the measurement such that the carrier envelope phase of the pulses in the sequence is about constant.

16 Claims, 2 Drawing Sheets

OTHER PUBLICATIONS

Kakehata et al., "Carrier-Envelope-Phase Stabilized Chirped-Pulse Amplification System Scalable to Higher Pulse Energies", Optics Express, vol. 12, No. 10, May 17, 2004, pp. 2070-2080.

Thomann et al., "Investigation of a Grating-Based Stretcher/Compressor for Carrier-Envelope Phase Stabilized fs Pulses", Optics Express, vol. 12, No. 15, Jul. 26, 2004, pp. 3493-3499.

* cited by examiner

CARRIER ENVELOPE PHASE STABILIZATION OF AN OPTICAL AMPLIFIER

PRIORITY CLAIM

This application claims priority of U.S. Provisional Application No. 61/228,461, filed Jul. 24, 2009, assigned to the assignee of the present invention and the complete disclosure of which is hereby incorporated by reference.

TECHNICAL FIELD OF THE INVENTION

The present invention relates in general to laser oscillator amplifier arrangements for delivering femtosecond pulses. The invention relates in general to such arrangements wherein a laser pulse is temporally stretched prior to amplification and the amplified pulse is temporally compressed before delivery.

DISCUSSION OF BACKGROUND ART

Optical pulses having a duration of a few femtoseconds or less may include only a few optical cycles at a fundamental carrier frequency of the pulse within an envelope of the pulse. A pulse-envelope typically has a Gaussian or Sech-squared form. The peak power within the envelope will depend on the phase of the carrier cycles relative to the envelope. This is referred to by practitioners of the art as the carrier envelope phase (CEP). FIG. 1A is a graph schematically illustrating a condition where the carrier is retarded in phase by an amount $\phi_{CE}$ with respect to the pulse envelope. The highest peak power will occur when a peak of one of the carrier cycles is exactly in phase $\phi_{CE}$=0.0) with the peak of the envelope. This is schematically illustrated in FIG. 1B. The less the number of cycles within the envelope, i.e., the shorter the pulse, the greater is this phase dependence of peak power in the pulse.

Techniques for stabilizing the CEP of a laser oscillator have long been known in the art. One such technique involves a closed loop feedback arrangement wherein the CEP is measured and compared with a desired value. Any difference between the measured and actual value is used to vary optical-pump power to a gain medium of the oscillator to drive the measured value back to the desired value. It has been found, however, that if a pulse from a CEP-stabilized oscillator is amplified in a chirped pulse amplification arrangement, wherein the input pulses from the oscillator are temporally stretched from an original duration before amplification and temporally compressed back to about the original pulse duration, the CEP of the amplified pulses will usually not be stable.

Temporal stretching and compression are typically effected using a separated parallel pair of gratings. One means of stabilizing output pulses from a chirped pulse amplification arrangement is disclosed in PCT publication WO 2007149956. Stabilization is effected by a closed loop arrangement in which the CEP is again measured and compared with a desired value. Any difference between the measured and actual value is used to vary the separation of gratings in the pulse stretcher or compressor of the amplifier to drive the measured value back to the desired value. Piezoelectric transducer (PZT) actuators are used to change the grating separation. It has been found practically that a grating mount with three PZTs is required to translate a grating and maintain parallelism. The PZTs must be identical such that each provides the same displacement for an applied electrical potential. As the CEP is relatively insensitive to change in separation this method stretches the limits of displacement that can be provided by PZTs. There is a need for a more sensitive CEP stabilization method for chirped pulse amplifiers that does not require a plurality of matched PZTs.

SUMMARY OF THE INVENTION

In one aspect of the invention, optical apparatus comprises an arrangement for generating a sequence of optical pulses. A pulse stretcher is provided for temporally stretching the optical pulses. The pulse-stretcher includes a first diffraction grating. The pulses are incident on the diffraction grating at a first incidence angle. An optical amplifier is arranged to amplify the temporally stretched optical pulses. A pulse compressor is provided for temporally compressing the amplified temporally stretched pulses. The pulse compressor includes a second diffraction grating. The amplified temporally stretched pulses are incident on the second diffraction grating at a second incidence angle. An arrangement is provided for periodically measuring a CEP of the temporally compressed amplified pulses and adjusting one of the first and second incidence angles cooperative with the CEP measurement such that the CEP of the temporally compressed amplified pulses is about constant.

DETAILED DESCRIPTION OF THE INVENTION

Figure 1A:
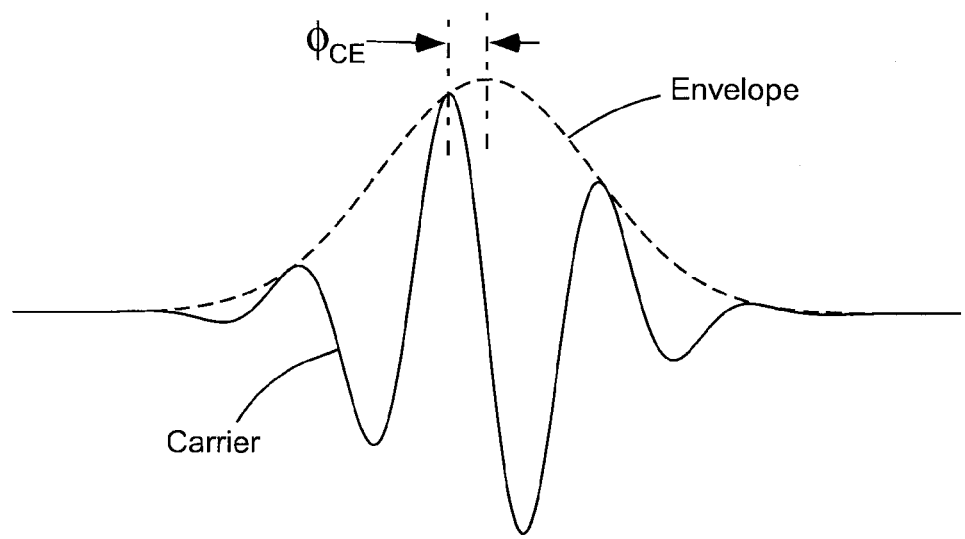
FIG. 1A is a graph schematically illustrating a carrier wave lagging a pulse envelope in phase by an amount $\phi_{CE}$.
Figure 1B:
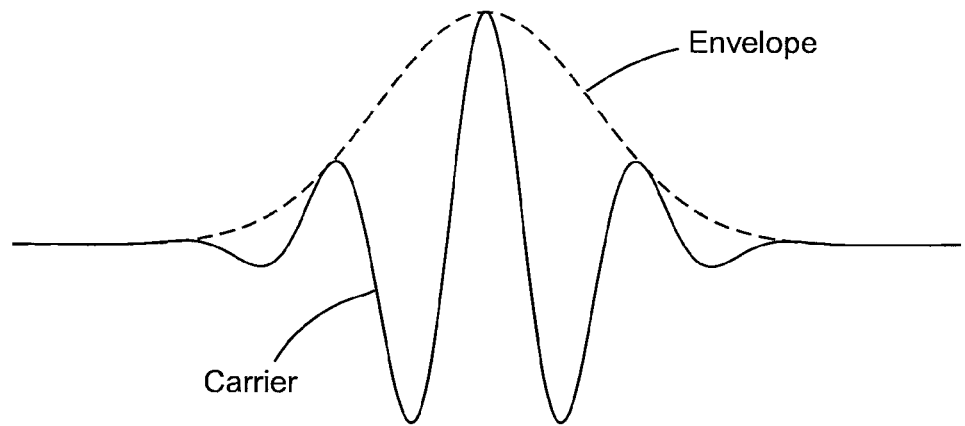
FIG. 1B is a graph schematically illustrating a carrier wave exactly in phase with a pulse envelope.
Figure 2:
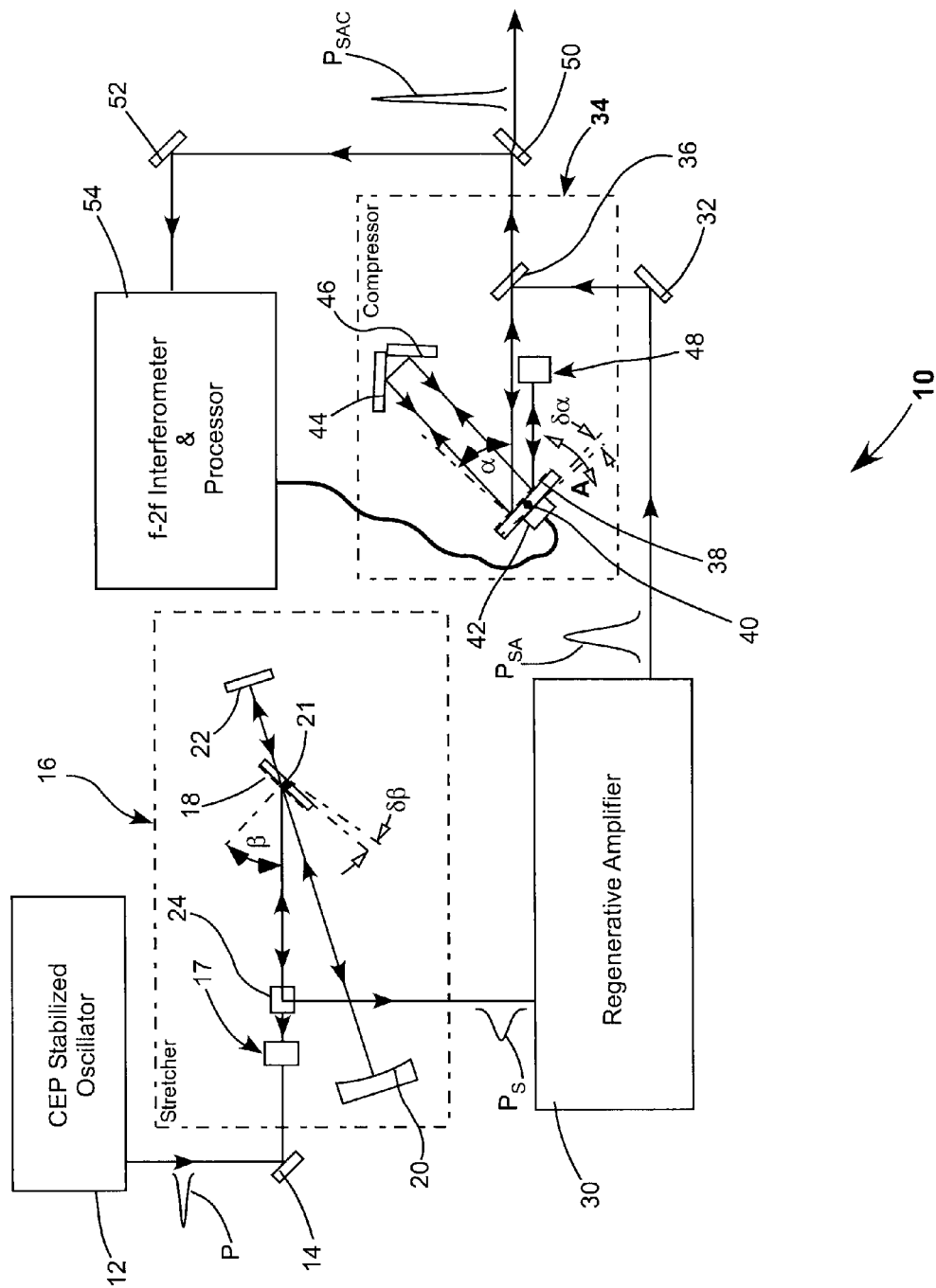
FIG. 2 schematically illustrates a preferred embodiment of apparatus in accordance with the present invention, including a CEP stabilized oscillator delivering pulses to be amplified, a pulse stretcher for temporally stretching pulses prior to amplification, a regenerative amplifier for amplifying the temporally stretched pulses, and a pulse compressor in accordance with the present invention for temporally compressing the amplified stretched pulses, and an interferometer for measuring the CEP of the compressed amplified pulses, the pulse compressor including a diffraction grating having a selectively variable angle of incidence for varying the CEP responsive to the measurement thereof by the interferometer such that the CEP can be maintained constant.

FIG. 2 schematically illustrates a preferred embodiment 10 of laser apparatus in accordance with the present invention. Apparatus 10 includes a CEP stabilized master oscillator (laser) 12 for providing seed-pulses for further amplification. One laser suitable for laser 12 is a model Micra-CEPS™ available from Coherent, Inc., of Santa Clara, Calif.

Laser 12 delivers a seed pulse P to be amplified via a turning mirror 14 into a pulse stretcher 16 for temporal pulse stretching. Stretcher 16 includes a retro-reflecting mirror pair 17 (only one mirror of the pair is visible in FIG. 2). Pulse stretcher 16 also includes a diffraction grating 18, a concave mirror 20, and plane mirrors 22 and 24.

Seed pulse P enters the stretcher through a space between the mirrors of the retro-reflecting mirror-pair 17 and is diffracted by grating 18. The pulse then follows a path from grating 18 to mirror 20; from mirror 20 to mirror 22; from mirror 22 back to mirror 20; from mirror 20 to grating 18; from grating 18 to mirror pair 17; from mirror pair 17 back to grating 18; from grating 18 to mirror 20; from mirror 20 to mirror 22; from mirror 22 to mirror 20; from mirror 20 to grating 18; and from grating 18 to mirror 24, which reflects the pulse, now a temporally stretched pulse $P_S$, out of pulse-stretcher 16. The pulse is incident on grating 18 at a nominal incidence angle β in a plane of incidence corresponding to the plane of the drawing. Minor 20 is tilted slightly in a plane perpendicular to the plane of the drawing which causes separation of beam paths perpendicular to the plane of the drawing. The paths converge from grating 18 to mirror 20 and converge from mirror 20 onto mirror 22. The converging paths pass over grating 18 in FIG. 2. This arrangement provides that grating 18 is imaged back onto itself by mirrors 20 and 22 to provide the effect of a grating pair having a separation therebetween equal to twice the distance between mirrors 20 and 22 plus twice the distance between grating 18 and mirror 20. The effective grating pair separation for stretching is equal to twice the distance between grating 18 and mirror 22.

The temporally stretched pulse PS is delivered from mirror 24 of stretcher 16 to a regenerative amplifier 30 for amplification. One amplifier suitable for use as amplifier 30 is a Legend-Elite™ regenerative amplifier, also available from Coherent, Inc.

Regenerative amplifier 30 delivers the amplified stretched pulse $P_{SA}$ via a turning mirror 32 to a pulse compressor 34 in accordance with the present invention. Within pulse compressor 34, a turning mirror 36 directs the pulse onto a diffraction grating 38 at a nominal incidence angle α to the grating. The pulse is diffracted from the grating and is translated by a pair of mirrors 44 and 46 arranged in the manner of a roof-prism or retro-reflector and returned to grating 38.

The pulse is then diffracted again onto another retro-reflecting mirror pair 48 (only one-of the pair visible in FIG. 2). Retro-Minor pair 48 vertically levels up and returns the pulse parallel to the original path to the grating which diffracts the pulse parallel to its originally incident path. Then the diffracted laser beam passes over mirror 36, and the pulse $P_{SAC}$ (now temporally compressed by the multiple diffractions from the gratings) is delivered from the pulse compressor as an output pulse. The pulses are incident on grating 38 at a nominal incidence angle α in an incidence plane corresponding to the plane of the drawing.

A beamsplitter 50 directs a sample, for example, about 2% of the output pulse, via a turning mirror 52 to an f-2f interferometer and processor. One commercially available interferometer for measuring CEP with signal processing for CEP stabilization is a Model APS800, available from MenloSystems GmbH of Munich, Germany. The interferometer measures the CEP of the pulse. The measured phase used by the processor to generate a feedback (error) signal to control the dispersion provided by the pulse compressor as follows.

Diffraction grating 38 is mounted on optical element mount 42 which can selectively tilt the diffraction grating about an axis 40 as indicated in FIG. 2 by double-headed arrow A, for controlling dispersion and accordingly CEP. One suitable such mirror mount is a model KC-PZ, available from Thorlabs, Inc., of Newton, N.J. The selective tilting of this mount is accomplished by a single PZT which is driven by the error signal generated by the interferometer and processor. This measurement and tilt (adjustment) process is carried out periodically for pulses in a train of pulses temporally stretched pulses to keep the CEP of pulses in the train constant, and preferably, but not necessarily, in an in-phase condition.

In the arrangement of FIG. 2 the incremental change in CEP δφ for a an incremental tilt angle δα (see FIG. 2) is given by an equation:

$$\delta\varphi = 2 * \frac{4\pi d G \cos\alpha}{\sqrt{1-(d\lambda-\sin\alpha)^2}} \delta\alpha \quad (1)$$

where d is the groove density of the grating in lines/mm, α is the nominal incidence angle on the grating as depicted in FIG. 2, λ is the central wavelength of the pulse spectrum and G is the (constant) path length between successive incidences of the pulse on grating 38. It should be noted here that equation (1) is derived for a similar equation for a grating pair compressor with one of the pair being tiltable, and wherein G is the separation of the gratings in the pair. The factor of 2 in equation 1 reflects the fact that the arrangement of FIG. 2 is the equivalent of a grating pair in which both gratings are tilted. For a true grating pair with only one grating tiltable, the factor 2 in equation (1) would be dropped and G would be the optical separation of the gratings.

In an example wherein G=60 centimeters (cm), α=45°, and d=1200/mm, δφ/δα=13.2 radians/microradian (rad/μrad). This means that at α=45°, a 1 μrad incident angle shift provides a 13.2 rad CEP shift. This same analysis can be used for grating stretcher, except that the separation G would be considered a negative value.

In an experiment to test the analysis using values discussed above for the grating line density, incidence angle and G, and with the grating mounted on the above-recommended PZT mirror mount, the CEP was recorded while the grating was reciprocally drive as indicated by double arrowheads A by a sinusoidal signal applied to the PZT mount at 0.5 Hz. The angular displacement of the PZT mount is about 1 μrad/V. The recorded phase data indicated δφ/δα=11.4 rad/μrad, which agrees relatively closely with the analytical result.

By way of comparison with the prior-art technique, wherein in CEP is controlled by varying separation G with incidence angle α held constant, the phase drift was measured when the grating was reciprocally horizontally translated by the PZT mirror mount. The result indicated that a 1 volt signal gave rise to only 0.25 rad CEP shift (or 4 rad/micrometer (μm) change in G). This agrees relatively well with a theoretical value of 3.4 rad μm, considering hysteresis of the PZT actuator. This indicates the inventive method of CEP control is about 40 times more sensitive than the prior-art method.

In an experiment to test stability of the inventive CEP control method, the CEP was locked for over 66 minutes with a RMS error of 169 mrad. Even with this low phase-noise level, however, the CE phase effect in many few-cycle, laser-atom interaction experiments may be detectable to some extent. Certain prior-art CEP stabilized systems reported in the literature use cryogenic cooling of a Ti:sapphire amplifier to minimize temperature-induced CEP drift or noise. In this example, however, the Ti:sapphire rod of the amplifier was only water cooled at the room temperature. Improved CEP stability results may be expected with a cryogenically cooled rod.

As noted above, while the method of the present invention is described with reference to change the indigence angle of a grating in a grating pulse compressor, the method may also be practiced by changing the incidence angle in a pulse stretcher. By way of example, in stretcher 16 this could be effected by tilting grating 18 about an axis 21, by an amount δβ (from a nominal incidence angle β as indicated in FIG. 2. This would be effected via an actuator (not shown) in a feed-back loop (not shown) with f-2f interferometer and processor similar to actuator 42 of pulse-compressor 34. The CEP measurement would still be made from the pulse $P_{SAC}$.

Also, while changing the incidence angle on the grating is described in terms of tilting the grating, the grating can be held fixed and the incidence angle can be changed by tilting one of the mirrors that are used to steer a pulse onto the grating. Further while the above described pulse compressor uses only a single grating imaged back on itself to create the effect of a grating pair, the inventive method may be implemented in a pulse stretcher or a pulse compressor which includes an actual grating pair by varying the incidence angle of only one of the gratings in the pair. These and other variations of the present invention may be practiced without departing from the spirit and scope of the present invention.

In summary, the present invention is described above with reference to a preferred and other embodiments. The invention is not limited, however, to the embodiments described and depicted, rather the invention is limited only by the claims appended hereto.

What is claimed is:

1. Optical apparatus, comprising:
    an oscillator for generating a sequence of optical pulses;
    a pulse stretcher for temporally stretching the optical pulses, the pulse-stretcher including a first diffraction grating, the pulses being incident on the diffraction grating at a first incidence angle;
    an optical amplifier arranged to amplify the temporally stretched optical pulses; and
    a pulse compressor for temporally compressing the amplified temporally stretched pulses, the pulse compressor including a second diffraction grating, the amplified temporally stretched pulses being incident on the second diffraction grating at a second incidence angle; and
    a detector for periodically measuring a carrier envelope phase (CEP) of the temporally compressed amplified pulses and with the output from the detector being used to adjust one of the first and second incidence angles cooperative with the CEP measurement such that the CEP of the temporally compressed amplified pulses remain about constant.

2. The apparatus of claim 1, wherein the second incidence angle is adjusted.

3. The apparatus of claim 2, wherein the pulses are incident on the second diffraction grating in an incidence plane and the second incidence angle is adjusted by tilting the second diffraction grating in the incidence plane.

4. The apparatus of claim 1, wherein the first incidence angle is adjusted.

5. The apparatus of claim 4, wherein the pulses are incident on the first diffraction grating in an incidence plane and the first incidence angle is adjusted by tilting the first diffraction grating in the incidence plane.

6. The apparatus of claim 1, wherein the first diffraction grating is cooperative with an optical arrangement for imaging the first grating back onto itself to provide an effect similar to a grating-pair pulse-stretcher.

7. The apparatus of claim 1, wherein the second diffraction grating is cooperative with an optical arrangement for imaging the second grating back onto itself to provide an effect of a grating-pair pulse compressor.

8. The apparatus of claim 1, wherein the carrier envelope phase measurement arrangement includes an f-2f interferometer.

9. Optical apparatus, comprising:
    an oscillator for generating a sequence of optical pulses having a wavelength $\lambda$;
    a pulse stretcher for temporally stretching the optical pulses;
    an optical amplifier arranged to amplify the temporally stretched optical pulses; and
    a pulse compressor for temporally compressing the amplified temporally stretched pulses, the pulse compressor including a diffraction grating having a groove density d and being cooperative with optical elements which cause that each of the temporally stretched pulses to be incident repeatedly on the diffraction grating at a predetermined nominal incidence angle $\alpha$ in an incidence plane, following a path having a length G between the repeated incidences; and
    a detector for periodically measuring a carrier envelope phase (CEP) of the temporally compressed amplified pulses and with the output from the detector being used to adjust the nominal incidence angle of the pulses on the diffraction grating cooperative with the CEP measurement such that the CEP of the temporally compressed amplified pulses is about constant.

10. The apparatus of claim 9, wherein the nominal incidence angle is adjusted by tilting the diffraction grating in the incidence plane.

11. The apparatus of claim 10, wherein adjustment of the CEP as a function of the adjustment of the incidence angle is approximated by an equation $$\delta\varphi = 2 * \frac{4\pi d G \cos\alpha}{\sqrt{1-(d\lambda - \sin\alpha)^2}} \delta\alpha$$

where $\delta\alpha$ is the incidence angle adjustment and $\delta\varphi$ is about the resulting CEP adjustment.

12. A method of controlling the carrier envelope phase (CEP) of laser pulses, said pulses being generated by an oscillator and supplied to an amplifier for amplifying the pulses, and wherein prior to entering the amplifier, the pulses are passed through a pulse stretcher for stretching the pulses and after leaving the amplifier, the pulses are passed through pulse compressor for compressing the pulses and wherein at least one of the stretcher and the compressor include a diffraction grating, said method comprising the steps of:
    monitoring the CEP of the pulses after they have been compressed;
    generating a feedback signal indicative of the CEP; and
    varying the angle of the incidence of the pulses on said grating in response to the feedback signal in order to adjust the CEP to a desired value.

13. A method as recited in claim 12, wherein said grating is supported on an angularly adjustable mount and wherein said step of varying the angle of the incidence of the pulses on said grating is performed by adjusting the angle of the mount.

14. A method as recited in claim 12, wherein angle of incidence of the pulses on said grating is adjusted in order to drive the CEP towards a constant value during the generation of a plurality of pulses in a train.

15. A method as recited in claim 12, wherein said grating is in the compressor.

16. A method as recited in claim 12, wherein the diffraction grating is cooperative with an optical arrangement for imaging the grating back onto itself to provide an effect similar to a grating-pair pulse-stretcher.

* * * * *